April 12, 1955  J. W. HUTCHINS ET AL  2,706,253
SELECTIVE WAVE LENGTH FILTER SPECTROPHOTOMETER
Filed Jan. 30, 1951
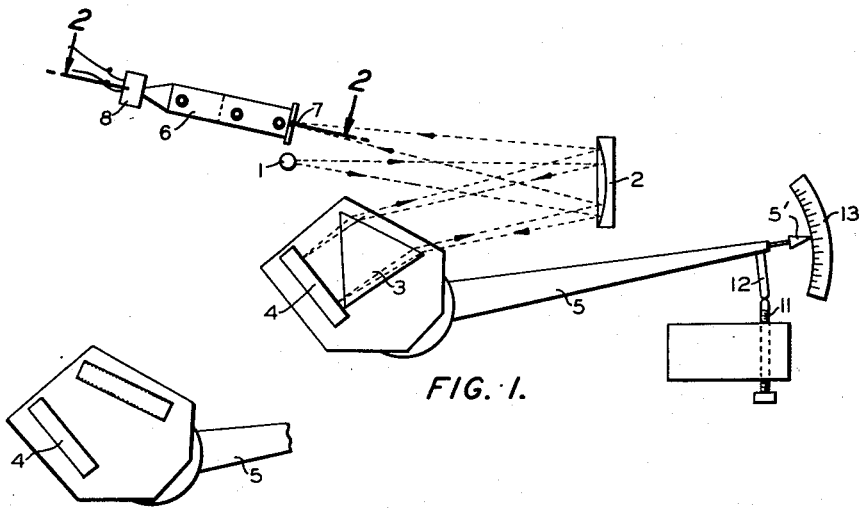
FIG. 1.
FIG. 1a.
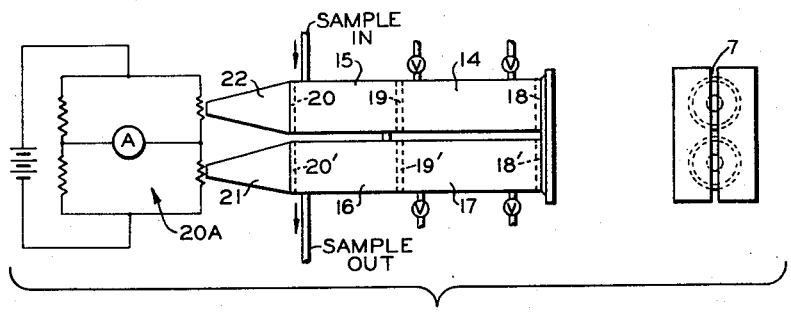
FIG. 2.
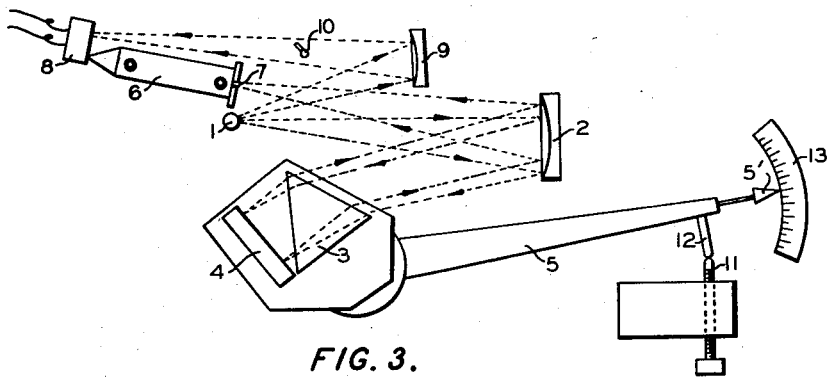
FIG. 3.
INVENTORS.
J. W. HUTCHINS
F. W. CRAWFORD
BY
Hudson + Young
ATTORNEYS

United States Patent Office 2,706,253
Patented Apr. 12, 1955

2,706,253

SELECTIVE WAVE LENGTH FILTER SPECTROPHOTOMETER

Joseph W. Hutchins and F. Weldon Crawford, Bartlesville, Okla., assignors to Phillips Petroleum Company, a corporation of Delaware Application January 30, 1951, Serial No. 208,598

15 Claims. (Cl. 250—43.5)

This invention relates to an improved on-stream infrared spectrophotometer. In one aspect this invention relates to an improved method for producing the desired frequency band of infrared radiation of high intensity for use in photometers. In another aspect this invention relates to an improved method for using high intensity infrared radiation for measuring the concentration of the components or composition of a flowing stream of a mixture of fluids. In another aspect this invention relates to a double beam infrared analyzer wherein a line source of radiation is used. In another aspect this invention relates to an on-stream infrared analyzer wherein a prism and flat mirror are rotated together to produce a narrow band of the spectrum. In still another aspect this invention relates to an on-stream infrared analyzer wherein the beam passes through the cells is passed first through a prism type monochromator then through a photometer. In still another aspect the invention relates to polished tubes in a photometer.

Infrared spectrophotometers find wide industrial application in measuring components of gaseous mixtures, especially in flowing streams of gaseous mixtures. The infrared spectrophotometer is especially useful in determining the composition of hydrocarbon gas mixtures.

The method and apparatus of this invention are described as applied to measuring the concentration of a component in a gaseous mixture of a hydrocarbon stream, or to the measuring the composition of same, but of course, are not limited thereby.

Prior art double beam infrared analyzers (photometers) make use of filters in the radiation beams to provide, by eliminating the undesired frequencies, the desired frequencies characteristic of those absorbed by the component for which the instrument is designed to detect. Fiters are limited in their use in that they cause difficulty in the selection of high intensity narrow bands, and allow weak undesired radiation to pass. Filters for desired bands are not readily obtainable. Thus at times several filters are combined to eliminate undesired frequencies which at the same time, however, reduce the radiation intensity available at the detector.

It has occurred to us that an improved infrared spectrophotometer would result from selecting, for measurement, a narrow band of the spectrum produced by the radiation source. Accordingly, therefore, the instrument of this invention is designed to make use of the dispersion powers of a prism or grating to spread out the frequency band of infrared radiation from a line source (not slit source) or other radiation in such a manner that a narrow frequency band required in any particular analysis can be obtained for use in an on-stream photometer. By the additional use of filters, filter cells, etc. with the photometer, it is possible to obtain a high degree of resolution in the instrument.

One form of an instrument of this invention comprises a line source of radiation, and an infrared spectrometer, placed ahead of a double beam on-stream photometer having polished cell walls.

Figure 1 is a top view of the analyzer, which is normally housed in a light tight container (not shown).

Figure 1a shows the use of a grating used in the place of the prism of Figure 1.

Figure 2 is a cross section along the line 2—2 of the cells of Figure 1.

Figure 3 is a top view of a modification of the analyzer of Figure 1.

In Figure 1 the source of infrared radiation is shown at 1 and consists of a straight heated filament of small diameter wire which takes the place of an entrance slit for light to the spectrometer. The wire filament in one model of the instrument was 1¼ inches long and used to produce a line source of 1¼ inches. This line source implies that the width of the two cells shown at 6 will not together be more than 1¼ inches.

Radiation energy passes from source 1 to a parabolic or spherical mirror 2 where it is reflected as parallel rays to a rotatable prism 3 and mirror 4. The mirror causes the refracted light to pass back through the prism. The prism and mirror are mounted on a table rotatable by means of arm 5 on a shaft (not shown). Arm 5 is held by a spring (not shown) or other means against peg 11. Peg 11 extends against peg 12 mounted in arm 5. Peg 11 may be extended or reduced in length by an adjustable means (not shown) to cause arm 5 and prism 3 and mirror 4 to be rotated to enable one to select the desired band of frequencies of infrared radiation to be made available at the entrance slits of the photometer cells designated as 6. On the outward end of arm 5 is located a needle 5' and a scale 13 graduated in wavelengths of the radiation being made available at the slits 7. The needle 5' and scale 13 may be located at any convenient point which will permit the operator to know the wavelength of radiation being made available in response to adjustment of peg 11.

The photometer part of this instrument is shown in Figure 2 as having slits 7 of approximately the same width as the line source. The slits are primarily used to prevent light of undesired wavelength from entering the cells. Behind the slits are the filter and sample cells 14 and 15 respectively in one beam and compensator and sample cells 17 and 16 respectively in the opposite beam. The arrangement, length, or the number of cells may take any arrangement and the cells as shown are to be considered as only illustrative. The cells are shown as having windows 18, 19, 20, 18', 19' 20', all of which may be made of the same material or of different material to afford filtering action as desired. The walls of the cells are polished so as to funnel the light through to the detectors which are connected in a bridge circuit 20A similar to that described in application Serial No. 114,157, filed September 6, 1949 which matured on March 23, 1954 as U. S. Patent No. 2,673,298. Polished funnels 21 and 22 are used after the cells in both beams to concentrate the light on the detectors. Sample or test cells 15 and 16 are shown connected together such that the stream being tested flows through both beams. It is understood that the arrangement of the photometer is only illustrative and that various modifications can be made in same without departing from the invention. The cells may be made in different lengths, the windows may take the form of lenses, and in some instances, one set of cells may be omitted entirely.

Figure 3 shows a modification of the invention making use of a test cell or cells 6 in only one beam of radiation. In this arrangement a portion of the radiation from the line source 1 strikes mirror 9 and then is focused on one of the detectors 8, without passing through any absorbing medium. Thus the intensity of radiation will be greater at this detector.

The beam which strikes the opposing detector is seen as originating from line source 1 and striking mirror 2 where the divergent rays are made parallel. The parallel rays are dispersed in passing through the prism 3 twice and thus are focused on the slit 7 of the photometer. The prism 3, mirror 4, arm 5, indicator 13, 5', etc. are movable as described in connection with Figure 1, thus any desirable wavelength may be selected to be passed through the photometer. It is obvious in this instance that if a line source 1¼ inches in length were used the single cell arrangement of Figure 3 would or could have twice the diametrical size of the cells used in Figure 1, since all of the energy is available for use with one cell. Thus greater energy is available before and after passing through the photometer cell. Since the detector elements are sensitive to the radiant energy striking same and not the frequency, it is obvious that only the quantity of energy striking the detectors at 8 needs to be balanced. Light trimmer shown diagrammatically at 10 may be used to reduce the intensity in the beam not passing through the cells indicated at 6. Filters could be used (not shown) alone or in connection with the trimmer to aid in balancing the radiation reaching the detectors.

The basic concept of this invention may be modified in many ways. Thus in the application of this invention, the source of radiation used may provide X-rays, visible light, ultraviolet light, infrared light or radio waves. Again it is possible to use a source emitting elementary particles such as electrons, alpha particles or high energy photons. It is further apparent that any suitable means may be used for detecting the unbalance of the detectors employed in the process of this invention. For example, it is possible to connect the detectors in opposition so that no signal is given by the detectors when the composition of the stream remains constant. This signal voltage may be suitably amplified to operate a valve or other control means. In this embodiment of the invention, it is apparent that process control can be automatic and anticipatory.

Reasonable variation and modification are possible within the scope of the foregoing specification and drawing and the apended claims to the invention, the essence of which is that an improved infrared spectrophotometer results from using a spectrometer and a double beam photometer in combination in connection with a line source of infrared radiation and polished funnel cells.

We claim:

1. In a method for measuring the components of a mixture of fluids the combination of steps comprising using a line source of radiation twice; reflecting said radiation into and through a radiation dispenser continuously; directing the same portion of a narrow band of the spectrum produced through a sample to be tested and through a filter; and detecting and recording the energy transmitted through said sample and said filter, and the energy of the remaining portion of said narrow band of the spectrum.

2. A double beam infrared spectrophotometer comprising in optical alignment a line source of infrared radiation comprising a heated wire of small diameter, a parabolic mirror, a prism, a flat mirror, said prism and flat mirror being in fixed relation to each other, so as to return the beam of radiation through said prism to said parabolic mirror but rotatable perpendicularly to the beam of radiation so as to select the desired portion of the spectrum, a first sample container having polished sides opaque to, and ends transparent to, infrared radiation, linearly aligned so as to receive a portion of the radiation returned from said prism and parabolic mirror, a second sample container having polished sides opaque to, and ends transparent to, infrared radiation linearly aligned so as to receive a portion of the radiation from said line source, one of said sample containers being provided with a filter, and a differential meter for detecting and recording the radiations transmitted through said sample and said filter containers.

3. An infrared absorption spectrometer comprising in serial optical alignment a source of infrared radiation, a parabolic mirror, a prism monochromator comprising a prism and a flat mirror disposed in fixed relation to each other so as to direct radiation continuously from said parabolic mirror through said prism to said flat mirror and again through said prism back to said parabolic mirror, said monochromator being rotatable perpendicularly to the beam of radiation for selection of the desired beam of radiation adjusted and disposed to separate from said radiation a narrow band of infrared radiation of the desired wavelength and return the same to said mirror, a sample cell being adapted to receive a fluid the composition of which is to be determined, two radiation detectors being disposed so that only a portion of said narrow band passing through said fluid energizes the first of said detectors while the remaining portion from said source energizes the second of said detectors and a meter to compare the response of said detectors.

4. The combination of claim 3 in which the source of radiation consists of an electrically heated wire filament.

5. An infrared absorption spectrometer comprising in serial optical alignment a source of infrared radiation, a parabolic mirror, a prism monochromator comprising a prism and a flat mirror disposed in fixed relation to each other so as to direct radiation continuously from said parabolic mirror through said prism to said flat mirror and again through said prism back to said parabolic mirror, said monochromator being rotatable perpendicularly to the beam of radiation for selection of the desired beam of radiation adjusted and disposed to separate from said radiation a narrow band of infrared radiation of the desired wavelength and transmit return the same to said mirror, a sample cell having an inlet and outlet conduit and being adapted to receive a continuous flow of fluid the composition of which is to be determined, two radiation detectors being disposed so that only a portion of said narrow band passing through said fluid energizes the first of said detectors while radiation from said source energizes the second of said detectors and a differential meter to compare the response of said detectors.

6. The combination of claim 5 in which the source of radiation consists of an electrically heated wire filament.

7. An infrared absorption spectrometer comprising in serial optical alignment a source of infrared radiation, a parabolic mirror, a prism monochromator comprising a prism and a flat mirror disposed in fixed relation to each other so as to direct radiation continuously from said parabolic mirror through said prism to said flat mirror and again through said prism back to said parabolic mirror, said monochromator being rotatable perpendicularly to the beam of radiation for selection of the desired beam of radiation adjusted and disposed to separate from said radiation a narrow band of infrared radiation of the desired wavelength and return the same to said mirror, a plurality of sample cells, connected in series for fluid flow therethrough, said cells each being adapted to receive a fluid the composition of which is to be determined, a plurality of filters each having a different filter characteristic, one disposed adjacent each of said cells, a plurality of radiation detectors being disposed so that one portion of said narrow band passing through said fluid in one of said cells and through one of said filters energizes the first of said detectors while another portion passing through said fluid in another of said cells and through another of said filters energizes a second one of said detectors, and a differential meter to compare the response of said detectors.

8. The combination of claim 7 in which the source of radiation consists of an electrically heated wire filament.

9. An infrared absorption spectrometer comprising in serial optical alignment a source of infrared radiation, a prism monochromator comprising a prism and a flat mirror disposed in fixed relation to each other so as to direct radiation continuously from said parabolic mirror through said prism to said flat mirror and again through said prism back to said parabolic mirror, said monochromator being rotatable perpendicularly to the beam of radiation for selection of the desired beam of radiation adjusted and disposed to separate from said radiation a narrow band of infrared radiation of the desired wavelength and transmit the same through each of a plurality of sample cells connected in series for fluid flow therethrough, said cells having an inlet and outlet conduit and being adapted to receive a continuous flow of fluid the composition of which is to be determined, a plurality of filters each having a different filter characteristic, one disposed adjacent each of said cells, a plurality of radiation detectors being disposed so that one portion of said narrow band passing through said fluid in one of said cells and through one of said filters energizes the first of said detectors while another portion passing through said fluid in another of said cells and through another of said filters energizes a second one of said detectors, and a differential meter to compare the response of said detectors.

10. The combination of claim 9 in which the source of radiation consists of an electrically heated wire filament.

11. An absorption spectrometer comprising in serial optical alignment a source of radiation, a prism monochromator comprising a prism and a flat mirror disposed in fixed relation to each other so as to direct radiation continuously from said parabolic mirror through said prism to said flat mirror and again through said prism back to said parabolic mirror, said monochromator being rotatable perpendicularly to the beam of radiation for selection of the desired beam of radiation adjusted and disposed to separate from said radiation a narrow band of radiation of the desired wavelength and transmit the same through each of a plurality of sample cells, connected in series for fluid flow therethrough, said cells having an inlet and outlet conduit and being adapted to receive a continuous flow of fluid the composition of which is to be determined, a plurality of filters each having a different filter characteristic, one disposed adjacent each of said cells, a plurality of radiation detectors being disposed so that one portion of said narrow band passing through said fluid in one of said cells and through one of said filters energizes the first of said detectors while another portion passing through said fluid in another of said cells and through another of said filters energizes a second one of said detectors, and a differential meter to compare the response of said detectors.

12. The combination of claim 11 in which the source of radiation consists of an electrically heated wire filament.

13. An apparatus for measuring the components of a mixture of fluids which comprises in serial optical alignment a source of radiation; a first reflector; a radiation disperser and a second reflector in fixed relation to each other adjusted and disposed so as to separate from said radiation a narrow band of radiation of the desired wave length and return same through said radiation disperser to said first reflector; a sample container adapted so as to receive said fluid mixture; a plurality of radiation detectors being disposed so that a portion of said narrow band passing through said fluid energizes the first of said detectors while radiation from said source energizes a second of said detectors; and means for comparing the response of said detectors.

14. The apparatus of claim 13 wherein said source of radiation comprises an electrically heated wire filament.

15. In a method for continuously determining the percentage of a given component in a stream comprising a mixture of fluids one of which is the given component the improvement which comprises passing a sample of said stream through a first examination zone; directing radiation from a source through a radiation disperser; returning said radiation through said radiation disperser; continuously directing a first portion of a narrow band of the spectrum produced by said disperser through said first examination zone; continuously directing a second portion of said narrow band through a second examination zone; and detecting and recording the energy transmitted through said sample, and the energy of the second portion of said narrow band of the spectrum in terms of percentage of the given component.

References Cited in the file of this patent

UNITED STATES PATENTS

| | | |
|---|---|---|
| 2,269,674 | Liddel et al. | Jan. 13, 1942 |
| 2,286,985 | Hanson | June 16, 1942 |
| 2,395,489 | Major et al. | Feb. 26, 1946 |
| 2,412,940 | Avery | Dec. 23, 1946 |
| 2,437,323 | Heigl et al. | Mar. 9, 1948 |
| 2,483,746 | White | Oct. 4, 1949 |
| 2,503,165 | Meyer | Apr. 4, 1950 |
| 2,525,445 | Canada | Oct. 10, 1950 |
| 2,613,572 | Mathieu | Oct. 14, 1952 |
| 2,621,298 | Wild et al. | Dec. 9, 1952 |

OTHER REFERENCES

Selective Infra-Red Gas Analyzers, by W. G. Fastie et al., Journal of the Optical Society of America, October 1947, pp. 762–768.

An Infra-Red Spectrometer for Industrial Use, by W. H. Avery, Journal of Optical Society of America, vol. 31, No. 10, pages 633–638.